United States Patent
Kulkarni et al.

(10) Patent No.: US 9,712,944 B2
(45) Date of Patent: Jul. 18, 2017

(54) SIMULTANEOUS MULTILINE M2M ACTIVATION

(71) Applicant: Verizon Patent and Licensing Inc., Arlington, VA (US)

(72) Inventors: Shankar Kulkarni, Bridgewater, NJ (US); Rohit Natu, North Brunswick, NJ (US); Awanish Singh, Somerset, NJ (US); Jeetendra Pradhan, Hackettstown, NJ (US); Mandar R. Hawaldar, Edison, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 152 days.

(21) Appl. No.: 14/330,380

(22) Filed: Jul. 14, 2014

(65) Prior Publication Data

US 2016/0014543 A1 Jan. 14, 2016

(51) Int. Cl.
| H04M 3/00 | (2006.01) |
| H04W 4/00 | (2009.01) |
| H04W 8/18 | (2009.01) |
| H04W 84/04 | (2009.01) |

(52) U.S. Cl.
CPC ............ H04W 4/005 (2013.01); H04W 8/18 (2013.01); H04W 84/04 (2013.01)

(58) Field of Classification Search
CPC ................. H04W 8/245; H04W 76/02; H04W 4/00–4/008; H04W 76/023; H04W 76/021; H04L 2209/68; G06F 17/30911; G06F 17/30923; G06F 3/1246

USPC ......... 455/418–422.1, 41.1, 41.2; 370/310.1, 370/328, 338
See application file for complete search history.

(56) References Cited

U.S. PATENT DOCUMENTS

| 2003/0149781 | A1* | 8/2003 | Yared ...................... G06F 21/41 709/229 |
| 2006/0050684 | A1* | 3/2006 | Bangham ............... G06Q 20/20 370/352 |
| 2012/0331292 | A1* | 12/2012 | Haggerty ............ H04L 63/0272 713/168 |
| 2013/0132854 | A1* | 5/2013 | Raleigh ................. G06F 3/0482 715/738 |
| 2014/0024361 | A1* | 1/2014 | Poon et al. .................... 455/419 |
| 2014/0098671 | A1* | 4/2014 | Raleigh ................. H04M 15/80 370/235 |

* cited by examiner

*Primary Examiner* — Erika Washington

(57) ABSTRACT

A computing device uses an integration module to manage bulk activation orders placed for machine-to-machine (M2M) devices. The integration module is configured to receive an M2M bulk activation order from a first user, where the M2M bulk activation order has information associated with a plurality of electronic devices. The integration module provides a single extensible markup language (XML) device identification request to a first database to identify a plurality of M2M devices from the plurality of electronic devices. The integration module also requests, via an XML number reservation request, a unique number for each respective M2M device of the first plurality of M2M devices. The integration module then employs the unique numbers to activate the plurality of M2M devices. After activation, the integration module may notify the user via a notification that the plurality of M2M devices have been activated.

20 Claims, 5 Drawing Sheets

SIMULTANEOUS MULTILINE M2M ACTIVATION

BACKGROUND

The phrase "machine-to-machine" (M2M) generally refers to technologies that allow networked devices to exchange information and perform tasks automatically without manual intervention. Such devices may communicate via "wired" or "wireless" technologies. To serve as several examples, devices such as telephones, sensors, meters, or devices included in home or business security solutions may include M2M technology.

Generally, M2M devices or systems communicate over wired or wireless networks. Some networks, whether wireless or wired, require that M2M devices or systems go through some type of registration or activation process so that the device or system may communicate over the network. If the registration or activation process is successful, the M2M device may be activated, thus allowing communication over the network.

Networks or systems typically process activation requests on a line-by-line basis. That is, networks or systems may be designed to process single-line authorization requests. This type of activation process can be time consuming if a client, customer, or seller is attempting to activate more than one device. For example, single-line authorization requests can be especially problematic in a commercial environment where batches of hundreds or thousands of M2M devices need to be activated for a client Thus, there is a need for a system that provides a stream-lined activation process.

DETAILED DESCRIPTION

Figure 1:
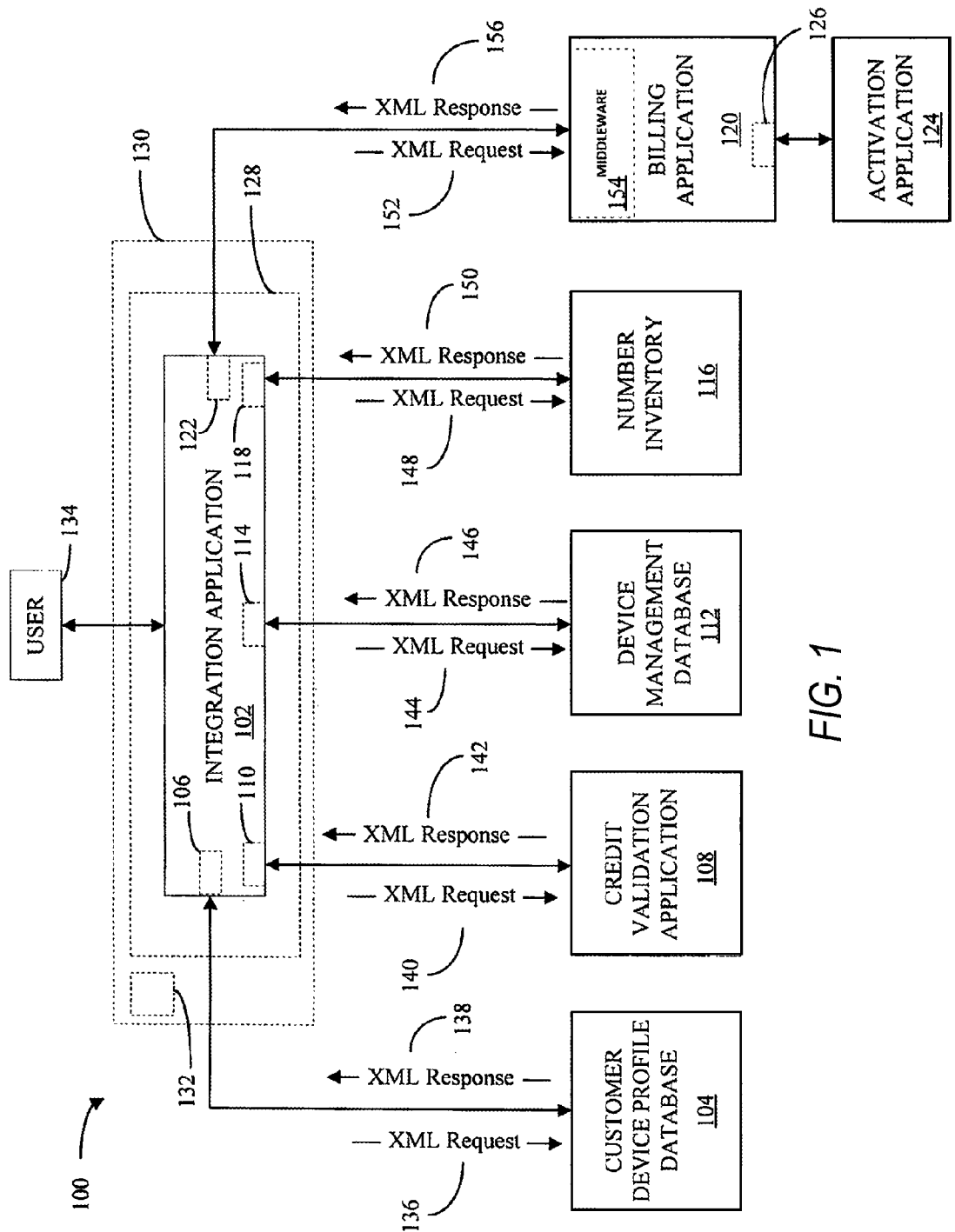
FIG. 1 illustrates an exemplary system for processing machine-to-machine (M2M) activation orders.

FIG. 1 illustrates an exemplary network system 100 for processing machine-to-machine (M2M) activation orders. System 100 includes at least one hardware processor 102 that controls an integration application. The at least one hardware processor 102 may be considered an integration module. The integration module 102 is communitavely coupled to a customer profile database 104 via a first application interface (API) 106, a credit validation application 108 communitavely coupled via a second API 110, a device management database 112 communitavely coupled via a third API 114, a number inventory 116 communitavely coupled via a fourth API 118, and a billing application 120 communitavely coupled via a fifth API 122. The billing application 120 may be communitavely coupled to an activation application 124 via a sixth API 126. Though six APIs 106, 110, 114, 118, 122, 126 are shown, it it contemplated that the system 100 may employ additional or different APIs (not shown) to aid in communication among applications and/or databases.

Integration module 102 may be stored on a memory (i.e., a tangible computer readable storage medium 128) of a computing device 130 having a central processing unit (CPU) 132. The CPU 132 at least carries out tasks driven by the integration module 102. Though not shown in the illustrative example, it is contemplated that the other applications 108, 120, 124 and databases or inventories 104, 112, 116 may also be stored on the computing device 130. Alternatively, in a different setting, additional processors, computing devices, and/or storage media (each not shown) may be employed to carry out tasks described herein.

With continued reference to FIG. 1, integration module 102 is configured to receive an M2M bulk activation order (a.k.a. a M2M bulk order) from a user 134 such as, for example, a client or potential client. An M2M bulk order is a request for activation of a plurality of M2M devices, where a plurality of M2M devices may in one exemplary approach include at least twenty-five M2M devices. As will be discussed below, if the M2M order is processed successfully by the system 100, the plurality of devices referenced in the M2M bulk order will be activated. The plurality of devices referenced in the M2M bulk order may each be associated with a product bundle chosen by the user 134 from a plurality of product bundles, where each bundle is associated with a pre-packaged plan/feature combination. The product bundles offered to the user 134 may be pre-validated, thus reducing or eliminating the need for doing a plan/feature/device validation on every single request in the M2M bulk order. That is, the selected product bundles may be pre-configured and validated for correctness, thus reducing errors at the time of activation. This is in contrast to product bundles that are not pre-validated, in which case system 100 would configure and validate each product bundle for correctness.

Integration module 102 performs an initial validation attempt on the M2M bulk order. The initial validation attempt may include, for example, an authentication of a user password included in the M2M bulk order (or provided with the M2M bulk order). The validation attempt may also include the integration module 102 determining if the user 134 is allowed to utilize the system 100, if the M2M bulk order is in the proper format (e.g., a proper extensible markup language format), and/or whether or not the M2M bulk order is properly populated with data that will be needed to process the order. Other validation procedures, techniques, or checks are also contemplated.

If the M2M bulk order is successfully validated, the integration module 102 of FIG. 1 stores a record of the M2M bulk order and notifies the user 134 via a synchronous response that the bulk order has been received. In other words, the user 134 places the bulk activation order and integration module 102 validates the order and sends a notification to the user 134 (e.g., to a user terminal from which the activation order was placed) that the order has been validated. It is contemplated that the notification includes an order number that may be used by the user 134 for future reference. If the M2M order is not successfully validated, the integration module 102 notifies the user 134. Such a user notification may alert the user 134 that the order was not received. In addition, or alternatively, the notification may provide details to the user 134 that are associated with the error (e.g., an improper format notification).

If the M2M bulk order is successfully validated, the integration module 102 employs the first API 106 to perform a first API call to the customer profile database 104. As such, a first extensible markup language (XML) request 136 (i.e., an XML profile request) is provided to the customer profile database 104. The first XML request 136 causes the customer profile database 104 to search for details pertaining to the user 134. For example, the customer profile database 104 may gather user contact information and/or a preliminary user credit approval. Further, the customer profile database 104 may also determine if the user 134 has permission to initiate activation of M2M devices and/or if there are geographic restrictions associated with user M2M device activations. A geographic restriction may limit the geographic area in which an M2M device may be activated. For example, an M2M device such as a home security device may be configured to call a local emergency service in a particular geographic area. As such, such a security device may have an associated geographic restriction that prevents such a device from being activated outside that particular geographic area. Beyond the user details discussed above, it is contemplated that the customer profile database 104 may also gather other user details.

Upon gathering the user information, the customer profile database 104 provides a first XML response 138 (i.e., an XML profile response) to the first API 106, which includes the gathered information. The integration module 102 then employs the second API 110 to initiate a second API call to the credit validation application 108. As such, the integration module 102 provides a second XML request 140 (i.e., an XML credit validation request) to the credit validation application 108. The second XML request 140 causes the credit validation application 108 to attempt to validate the credit approval gathered from the customer profile database 104. The credit validation application 108 then employs a second XML response 142 (i.e., a XML credit validation response) to pass the credit validation determination to the second API 110 of the integration module 102.

If the credit for the user 134 was not validated, processing of the M2M bulk order ceases and the user 134 is notified. Alternatively, however, if the integration module 102 determines through the second XML response 142 that user credit has been approved, then the integration module 102 employs the third API 114 to initiate a third API call to the device management database 112 so that M2M devices in the M2M bulk order may be identified. Accordingly, a third XML request 144 (i.e., an XML device identification request) is provided to the device management database 112. The third XML request 144 provides a bulk device listing to the device management database 112. The bulk device listing includes a listing of all the devices listed in the M2M bulk order. The device management database 112 then determines if each device listed in the M2M bulk order is an M2M device. For example, if a user inadvertently references or lists a non-M2M device among the other M2M devices in the M2M bulk order, the device management database 112 will determine which device is not an M2M device. This validation/verification may be based on the device IDs (e.g., electronic serial number (ESN) or mobile equipment identifier (MEID)) provided in the bulk order. That is, the device IDs may be compared to M2M device IDs in the device management database 112 to determine if each device is an M2M device.

After the device verification information is gathered, the device management database 112 employs a third XML response 146 (i.e., an XML device identification response) for the third API call and provides the response to the integration module 102. This response may indicate that each of the electronic devices are M2M devices, that a subset (i.e., a plurality) of the electronic devise are M2M devices, or that only one device is an M2M device. It is possible that the response may also indicate that none of the devises are M2M devices. In such a situation, the user 134 would be notified and order processing would cease.

It is noted that the APIs (e.g., the third API 114) are configured for bulk orders. As such, processing times can be minimized. For example, a M2M bulk order may reference 2000 M2M devices. By employing the third API 114 in such an example, a single call can be employed to provide the information pertaining to all 2000 devices to the device management database 112. This is in contrast to employing 2000 calls to send information related to 2000 devices to the device management database 112.

With continued reference to FIG. 1, if via the third XML response 146, the integration module 102 is notified that one or more devices in the M2M bulk order is not an M2M device, the integration module 102 notifies the user of the error. It is contemplated that the order processing for the M2M bulk order may then cease if an error is found. Alternatively, the non-M2M devices listed in the M2M bulk order may be removed from the M2M bulk order so that order processing may continue. Further, whether or not the order processing ceases or the non-M2M devices are removed from the M2M bulk order, the user may be provided a listing of the verified M2M devices and/or a listing of the one or more non-M2M devices.

Upon verification or identification of the M2M devices in the M2M bulk order, the integration module 102 employs the fourth API 118 to initiate a fourth API call to the number inventory 116. As such, a fourth XML request 148 (i.e., an XML number request) is provided to the number inventory 116 to request that a unique number, such as a telephone number, be assigned or reserved for each verified M2M device in the M2M bulk order. The number inventory 116 then assigns or reserves a unique number (e.g., telephone number) to each verified M2M device referenced in the M2M bulk order and provides the information in bulk to the integration module 102 via a fourth XML response 150 (i.e., an XML number response).

The number inventory 116 may also, or alternatively, assign or reserve a static internet protocol (IP) addresses for one or more of the verified M2M devices in response to the fourth XML request 148. That is, the assigned unique number may be an IP address. As such, static IP addresses may also be provided in the fourth XML response 150.

The fourth API 118 is also configured for bulk operation. For example, if 2000 telephone numbers are requested for 2000 devices, one API call may be employed to request the 2000 telephone numbers from the number inventory 116. Alternatively, chunks of requests may be spread over several API calls if the number inventory 116 is unable to process the 2000 exemplary telephone number requests in bulk. For example, if the telephone inventory can only handle up to 800 telephone number requests in bulk, two API calls may request 800 telephone numbers and the third API call may, for example, request 400 telephone numbers. Regardless of whether one API call is employed or several, due to the ability to operate in a bulk environment, 2000 API calls need not be employed to reserve 2000 telephone numbers. As such, since APIs (e.g., the fourth API 118) may be configured for bulk operation, API calls are reduced as are processing times.

Still referring to FIG. 1, after receiving the plurality of telephone numbers and/or static IP addresses, the number inventory 116 may also send the integration module 102 a sales identifier associated with the M2M bulk order and a sales person responsible for the M2M bulk order. The sales identifier may be used to make a commission payout to the sales person.

Regardless of whether or not a sales identifier is provided to the integration module 102, after receiving the telephone numbers and/or static IP addresses, the integration module 102 employs the fifth API 122 configured for bulk operation to initiate a fifth API call to the billing application 120. As such, the fifth API 122 provides a fifth XML request 152 to the billing application 120 to initiate billing for the M2M devices in the M2M bulk order. The billing application 120 verifies the structure and format of the fifth XML request 152 to ensure that it is the proper form to carry out billing procedures. It is contemplated that, instead of employing the billing application 120 to validate the form and structure of the fifth XML request 152, a middleware application 154 (shown in phantom) may be employed to carry out the validation. The middleware application 154 may employ its own APIs (not shown), configured for bulk operation, to communicate with the billing application 120.

If the structure and format of the fifth XML request 152 are not in the proper format or structure for the billing application 120, the integration module 102 is notified. If, however, the structure and format of the fifth XML request 152 is validated by either the middleware application 154 or the billing application 120, each telephone number and/or static IP addresses associated with M2M devices of the M2M bulk order is sent individually to the activation application 124 via the sixth API. 126. Individually, activation for each M2M device is then initiated by the activation application 124. It is contemplated that the activation application 124 may contact an outside source (not shown) to complete the activation of each referenced M2M device.

Upon activation of each M2M device, the activation application 124 notifies the billing application 120. The billing application 120 or the middleware application 154 then aggregates the notifications or acknowledgements of activation from the activation application 124. Once aggregated, a single bulk acknowledgment (i.e., a bulk confirmation) is sent via a fifth XML response 156 to the integration module 102. As such, the integration module 102 is notified via a bulk acknowledgment or confirmation that each M2M device of the M2M bulk order has been successfully activated. The integration module 102 then associates or compares at least a portion of the confirmation to at least a portion of a stored record of the M2M bulk order (i.e., the bulk order record that was stored by the integration module 102 as the user was initially notified that the order was received). This ensures that the confirmation is associated with a bulk order. After the integration module 102 associates the confirmation with a stored record of the M2M bulk order, the integration module 102 sends the user 134 a notification that activation of the M2M devices listed in the M2M bulk order is complete.

Since acknowledgment of M2M device activation passes through the billing application 120 and then to the integration module 102 via the fifth XML response 156, the fifth XML response 156 may be considered an XML billing and activation response while the fifth XML request 152 may be considered an XML billing and activation request.

The APIs employed (e.g., APIs 106, 110, 114, 118, 122, 126) in the system 100 may employ asynchronous callbacks, to thereby eliminate or reduce the need for check status calls. That is, since the integration module 102 and billing application 120 are notified when processes are complete (see e.g., callbacks employing first through sixth XML responses 138, 142, 146, 150, 156), check status calls may be eliminated. For example, the user 134 need not check on the status of the order since the user is notified when the M2M bulk order has been processed. Further the integration module 102 need not check on the status of API calls, since the API calls are of the API callback variety. Accordingly, API calls are reduced and, in turn, computing processing times are improved to enable more efficient mainframe processing.

In the event that an error occurs and the system 100 is unable to provide the proper API response to a particular API request, the callback response (see e.g., callbacks employing first through sixth XML responses 138, 142, 146, 150, 156) may simply include an error notification.

Though responses, requests, and formats described above with respect to FIG. 1 are described as XML responses, requests, and formats, they may instead be provided in a language or standard other than XML.

Figure 2A:
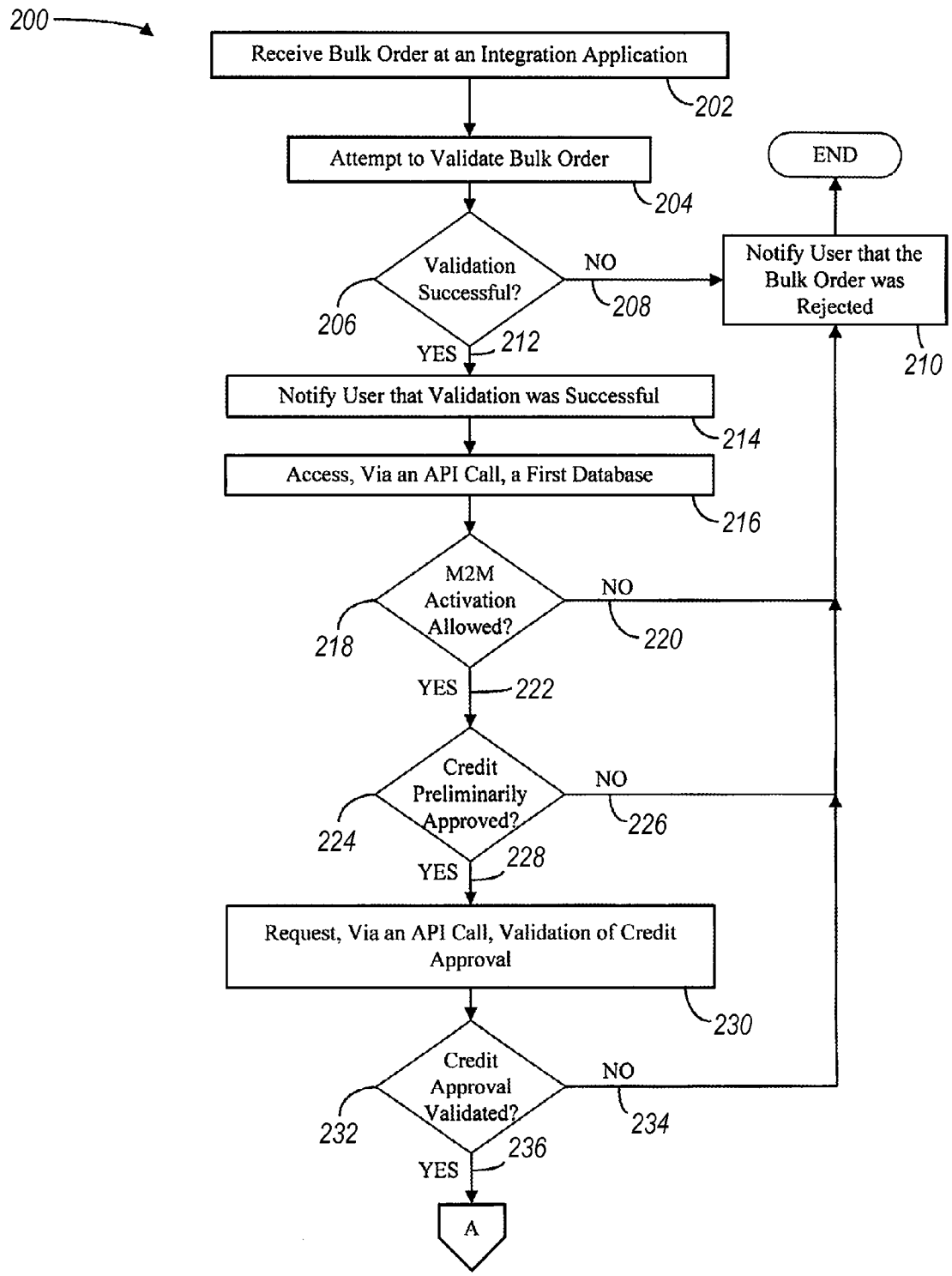
FIGS. 2A-B depict a flowchart that illustrates an exemplary technique for processing M2M activation orders.
Figure 2B:
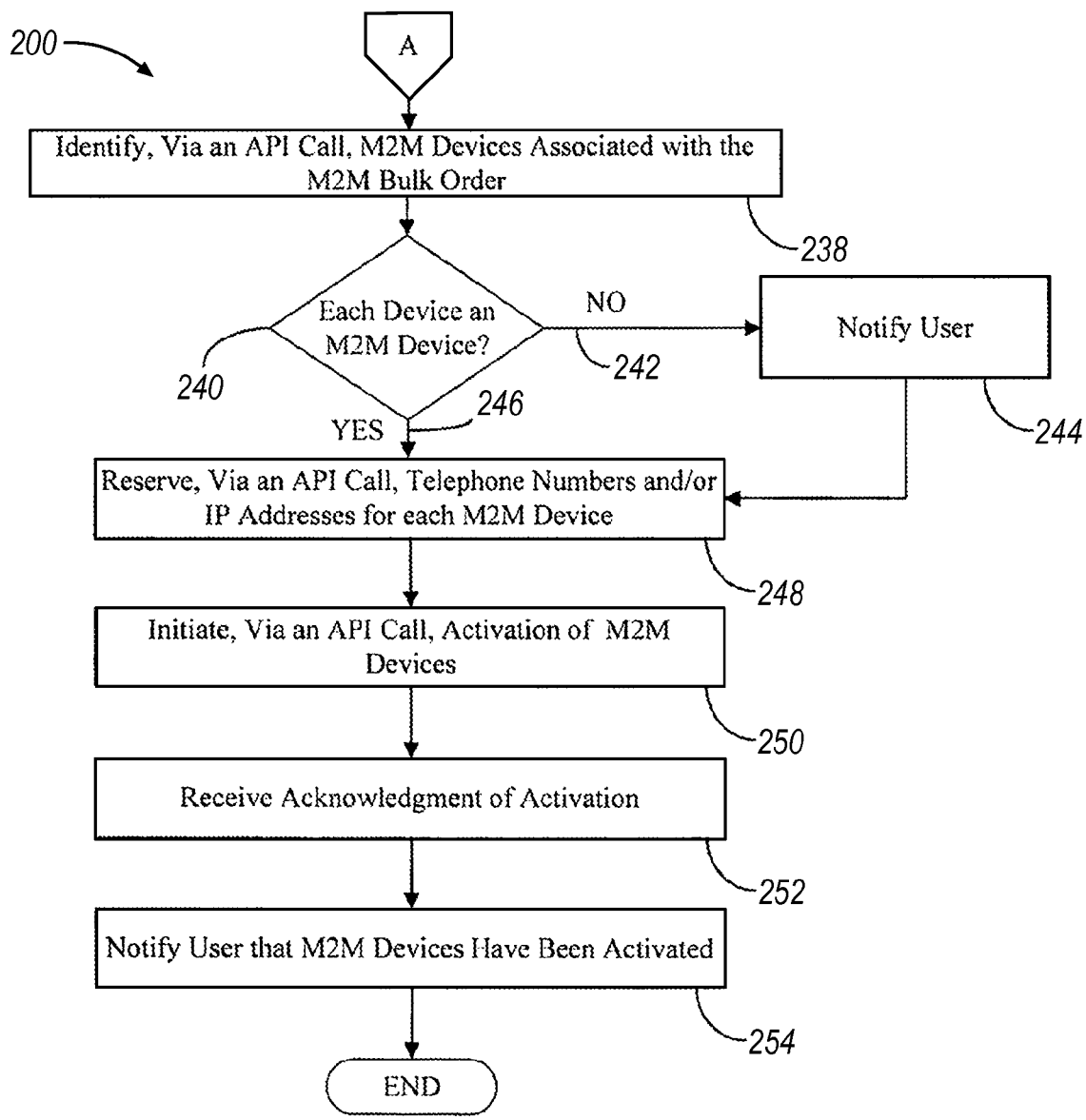

With reference now to FIGS. 2A-2B, a flowchart illustrates an exemplary technique 200 for processing bulk orders. Exemplary technique 200 begins at block 202 of FIG. 2A, where an integration module (e.g., integration module 102 of FIG. 1) receives an M2M bulk order. Process control then proceeds to block 204 of FIG. 2A, where the integration module attempts to validate the M2M bulk order. The integration module may employ a variety of techniques to try to validate the M2M bulk order. Several examples of order validation were set forth above with respect to FIG. 1.

After order validation has been attempted at block 204 of FIG. 2A, process control proceeds to decision block 206 and it is determined whether or not order validation was successful. If order validation was not successful 208, process control proceeds to block 210 and the user is notified that the submitted M2M order was rejected or not accepted. It is contemplated that the notification may include details pertaining to the rejection. Process control then proceeds to an end.

If, on the other hand, it is determined at decision block 206 that order validation was successful 212, process control proceeds to decision block 214 and the user is notified that the M2M bulk order was accepted (i.e., order validation was successful). Process control then proceeds to block 216 and a first database (e.g., customer profile database 104 of FIG. 1) is accessed via an API call. The first database includes a plurality of profile information associated with a plurality of users. For example, the first database may include profiles that include user addresses, user credit approvals, user permissions, and user identification numbers. Other user information beyond the examples provided is also contemplated. Once the first database is accessed, process control proceeds to decision block 218 and it is determined from the first database whether or not the client or user has permission to initiate activation of M2M devices. If the user does not have permission 220, the user is notified at block 210 that the order has been rejected and/or that M2M activation permission is denied. Process control then proceeds to an end.

However, if the user has permission 222 to initiate M2M activation, process control proceeds to decision block 224 and it is determined whether or not the user has a tentative credit approval (e.g., a blanket approval) for the M2M order. If the user does not have 226 tentative credit approval, process control proceeds to block 210 and the user is notified that the order has been rejected and/or that tentative credit approval has been denied.

Alternatively, if tentative credit approval is granted 228, process control proceeds to block 230. It is noted that the preliminary credit approval determination at decision block 224 may occur prior to, or at the same time as, determining whether or not the user has permission to initiate M2M activation at decision block 218. Further, other decisions (not shown) based on user information may also be employed to determine if a user's M2M bulk order should be rejected.

Proceeding with exemplary technique 200, at block 230 a request for credit approval validation is made via an API call. After the credit validation request is made, process control proceeds to decision block 232 and it is determined whether or not the user credit approval was validated. If the credit approval was not validated 234, process control proceeds to block 210 and the user is notified than the M2M order has been rejected and/or that the user's credit approval failed validation. Process control then proceeds to an end.

Alternatively, if the user's credit approval has been validated 236, exemplary technique 200 continues at block 238 of FIG. 2B, where M2M devices in the M2M bulk order are identified. To identify the M2M devices, an API configured for bulk operation is employed to access a second database (e.g., device management database 112 of FIG. 1). Since the API is configured for bulk operation, a single API call (e.g., an XML request with a corresponding XML response) can be employed to determine if each of the plurality of devices in the M2M bulk order is an M2M device. This is in contrast to employing a plurality of API calls, one for each referenced device in the bulk order.

It is noted that the API call is of the callback variety (i.e., for every XML request there is an XML response). As such, an additional call(s) does not need to be made to the second database to check on the status of the identification since the XML request initiates the XML response. The XML response may simply be a response to the content of the XML request or an error notification. Due to the API's ability to operate in a bulk environment and since the call being employed is of the callback variety, API calls may be minimized, which in turn minimizes processing times.

Still referring to FIG. 2B, after the M2M devices associated with the M2M bulk order are identified, process control proceeds to decision block 240 where, based on the M2M device identification at block 238, it is determined whether each device referenced in the M2M order is an M2M device. If each device referenced in the order is not 242 an M2M device, process control proceeds to block 244 and the user is notified that one or more devices in the M2M order is not an M2M device. Upon notification to the user, or if it is determined that each device in the M2M bulk order is an M2M device 246, process control proceeds to block 248 and telephone numbers and/or static IP addresses are reserved for the identified M2M devices.

Reservations are made through an API call (e.g., an XML number reservation request) employed to access a database that includes an inventory (e.g., number inventory 116 of FIG. 1) of unique numbers such as available telephone numbers and/or IP address. This API call is also of the callback variety and the originating API is configured for bulk operation. Accordingly, a single API call may be employed to reserve, for example, 800 telephone numbers and/or IP addresses for 800 M2M devices. Further, since the API call is a callback-type call, the originator of the API call (e.g., integration module 102 of FIG. 1) need not employ check status calls. That is, since the database will reply back with a single XML response (e.g., an XML number reservation response) for each XML request received, the API call originator need implement API status calls.

After the telephone and/or static IP addresses are reserved, process control proceeds to block 250 of FIG. 2B and activation of the M2M devices is initiated. It is contemplated that an application, such as integration module 102 of FIG. 1, employ a single API call to provide each of the reserved telephone numbers and/or IP addresses to a system or group of applications (e.g., middleware application 154, billing application 120, and activation application 124, each of FIG. 1), that carry out billing and activation. Since the system carries out both billing and activation tasks, errors that may result in activating an M2M device, but not billing for such device, may be minimized or avoided.

After activation is initiated, process control proceeds to block 252 and acknowledgment of the activation of each device is received via a single callback (e.g., a single XML response provides acknowledgement that the plurality of M2M devices has been activated). If there is a failure to activate any of the M2M devices referred to in the M2M bulk order, notice of the failure may be included in the bulk acknowledgment.

When the acknowledgement is received, process control proceeds to block 254 and the user is notified that the M2M devices associated with the M2M bulk order have been activated. In other words, the user is notified that the order has been processed. Exemplary technique 200 then ends as shown.

Figure 3:
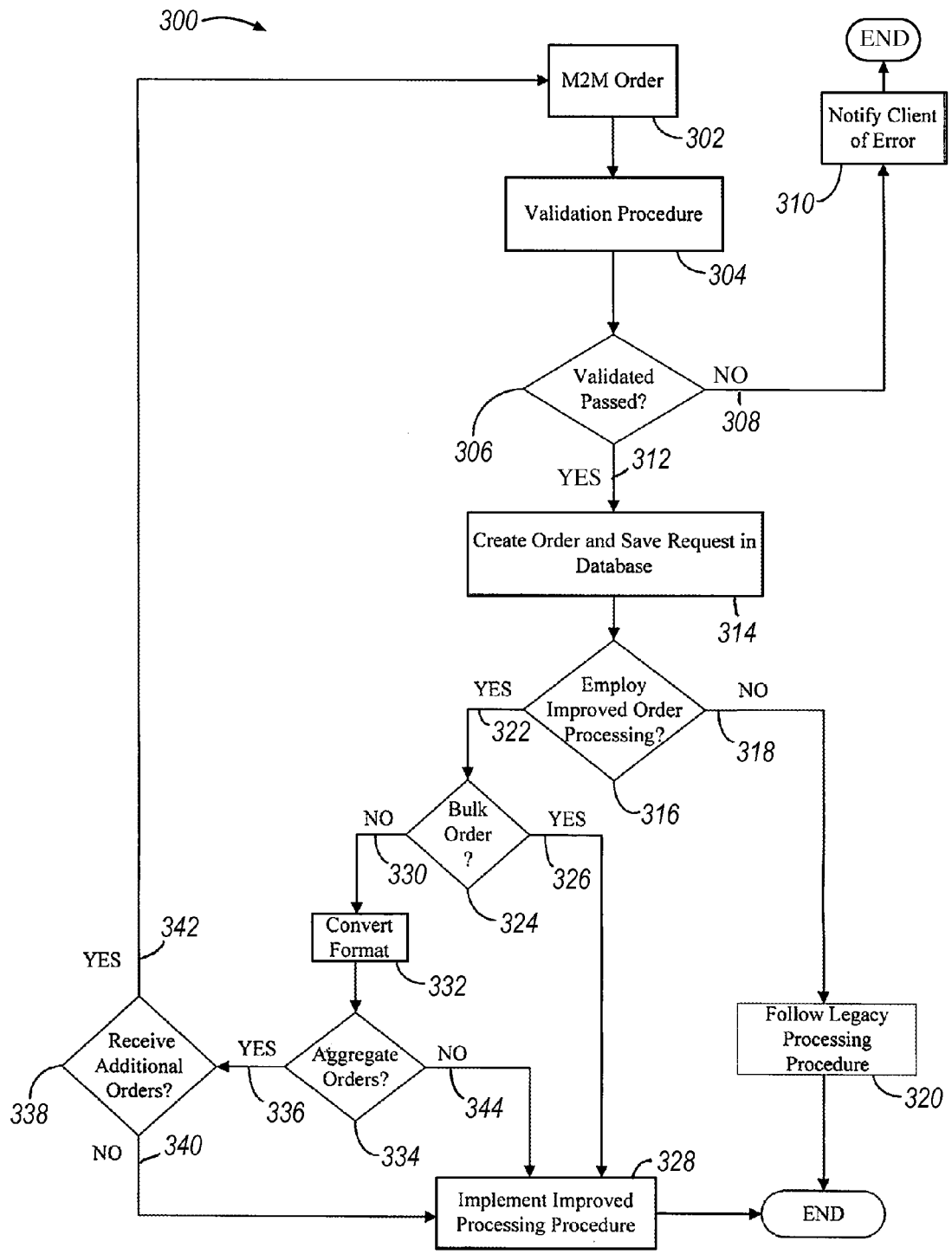
FIG. 3 depicts a flowchart that illustrates another exemplary technique for processing M2M activation orders.

With reference now to FIG. 3, an exemplary technique 300 for device activation is shown. Process control begins at block 302 where an M2M order (i.e., a request for activation of an M2M device(s)) and password (or other login information) is received. An application, such as integration module 102 of FIG. 1, may receive the M2M order and password or other login information. Further, it is contemplated that the M2M order may include the password or login information.

The M2M order may, for example, be a bulk order that includes an order request for multiple M2M devices or the received order may be an M2M order associated with a single device. Upon receiving the order and password (or other login information), process control proceeds to block 304, where a validation procedure is implemented. The validation procedure may include, for example, an authentication, authorization, and a determination of whether or not the order is in a proper format. The authentication may, for example, include determining whether or not the received password and/or login information is valid. Authorization may, for example, include determining whether or not the user associated with the password and/or login information is allowed to place an order or whether or not any restrictions apply that would inhibit processing the order. A determination of whether or not the order is in a proper format may, for example, include determining that the order format includes a proper XML structure and whether the order includes the information needed for processing.

After implementation of the validation procedure, process control proceeds to decision block 306 and it is determined whether or not the M2M order passed the validation procedure. If the M2M order was not validated 308 (e.g., the order is not authenticated, authorized, and/or not in the proper format), process control proceeds to block 310 and the user is notified that the M2M order did not pass the validation procedure. In addition, or alternatively, the user may be provided details about the validation failure. For example, the user may be notified that the password or other login information was not accurate. As another example, the user may be notified that she is not authorized to place the order, and/or that the order format was not in the proper format. Regardless of the details of the notification, process control proceeds to an end after notification.

If, on the other hand, it is determined that the M2M order was validated 312, process control proceeds to block 314 and the order is made active and a record of the order is saved in a database. Process control then proceeds to decision block 316 and it is determined whether or not the order will be processed by an improved procedure, such as the procedure(s) discussed above with respect to FIGS. 1-2B, or if the order will be processed via a legacy procedure (not shown).

It is contemplated that a user or group associated with the user may make the determination of whether the order will be processed by the legacy procedure or improved procedure via an input. Alternatively, the information received in the order itself at block 302 may be employed to make the determination at decision block 316. That is, the M2M order may include an indicator that indicates whether the legacy procedure should be employed or the improved procedure should be employed. If it is determined that the improved order procedure will not be employed 318, process control proceeds to block 320 where a legacy procedure is employed. After implementation of the legacy procedure, process control proceeds to an end.

Alternatively, if it is determined that the improved ordering procedure will be employed 322, process control proceeds to decision block 324 and it is determined whether or not the order is a bulk order. An application, such as the integration module 102 of FIG. 1, may be employed to make such a determination via an analysis of the order or an analysis of a user profile that the application may access.

With continued reference to FIG. 3, if it is determined at decision block 324 that the order is a bulk order 326, process control proceeds to block 328 and the improved procedure is implemented to process the bulk order. Examples of the improved procedure are provided above with respect to FIGS. 1-2B. By entering a bulk order at block 302 of FIG. 3 and employing the improved procedure 322, a user is able to submit a single order for multiple M2M devices (e.g., 2000 devices) rather than submitting multiple orders, each for a single M2M device. After implementation of the new procedure(s) process control proceeds to an end.

If, on the other hand, it is determined at decision block 324 that the order is not a bulk order 330 (i.e., the order is for a single M2M device), process control proceeds to block 332, where the order is converted to a format acceptable to the improved processing procedure. It is contemplated that conversion may not be needed if the order is in a proper format. Whether conversion occurs or not, process control then proceeds to decision block 334, where it is determined whether or not the current order will be aggregated with other orders. For example, a user may decide to submit multiple orders and desire that the multiple orders be aggregated into a bulk order. An application, for example, may determine that the user intends to aggregate orders via an analysis of information in the order or via an analysis of a profile associated with the user. That is, the application may access the order or associated profile and determine if an attribute/flag exists to indicate that the orders will be aggregated.

Accordingly, if it is determined at decision block 334 that orders will be aggregated 336, process control proceeds to decision block 338 and it is determined whether or not additional orders will be received for the aggregated order. There are a variety of ways such a determination may be made. For example, when it is determined at decision block 334 that orders will be aggregated 336, the user may be given an allotment of time to submit a desired quantity of orders. The user, via a user interface, may be provided with a "count-down" or the remaining time left in the allotment of time once initiated. If the allotment of time has elapsed, process control may determine that there are no more additional orders 340 to aggregate. Alternatively, if the allotment of time has not elapsed, but the user is finished inputting orders, the user may notify the application via a user input that order entry is complete.

If the allotment of time has not been reached and/or the user has not provided an input that order entry is complete, process control may determine that there are additional orders 342 to aggregate. As such, process control proceeds back to block 302, where another order from the user is received and exemplary technique 300 continues.

As another example for how the determination of whether or not additional orders are to be received at decision block 338, a quantity of orders may be predetermined by the user. According to such an example, processes control may compare the number of already aggregated orders with the predetermined quantity. It is contemplated that the difference between the already aggregated orders and the predetermined quantity may be provided to the user via a user interface.

If, based on the comparison of the already aggregated orders and the predetermined quantity, the predetermined quantity has been reached, process control may determine at decision block 338 that no more additional orders 340 are to be received. Alternatively, if the quantity has not been reached, process control may determine that additional orders will be received 342.

Regardless of whether the determination at decision block 338 is based on an allotment of time, a predetermined quantity, or some other piece of information or technique, process control proceeds to block 302 when it is determined that additional orders will be received 342.

Alternatively, if based on the examples above or some other piece of information or technique, it is determined that additional orders will not be received 340, process control proceeds to block 328 and the improved procedure is implemented.

It is possible that only a single M2M order may be processed by the improved procedure. For example, it may be determined at decision block 316 to employ 322 the improved procedure. Then, after conversion at block 332 (if needed), it may be determined at decision block 334 not to aggregate 344 orders. As such, process control proceeds to block 328 and the improved processing procedure is implemented. Some of the benefits and efficiencies attributed to bulk order procedures (see for example procedures discussed above with respect to FIGS. 1-2B) may be lost when processing only a single order. However, there are still benefits and efficiencies attributed to processing a single order via the improved procedure(s). For example, since APIs that utilize callbacks are employed, order processing times may decrease since API status calls may be avoided.

Though responses, requests, and formats described above with respect to FIGS. 1-3 are often referred to as XML responses, requests, and formats, languages or standards other than XML may instead be employed. As such, the above-described responses, requests, and formats may be in a language or standard other than XML.

Figure 4:
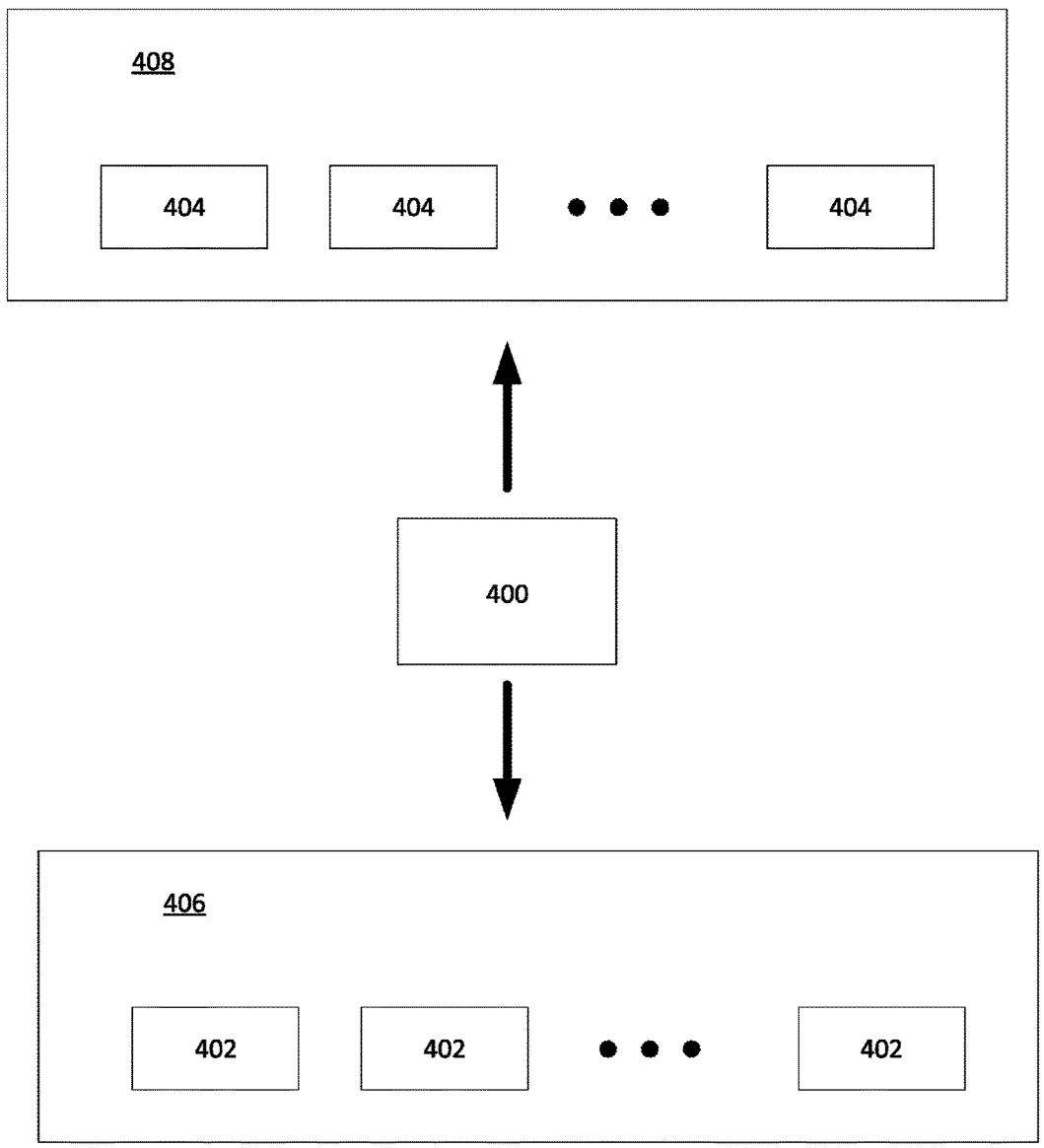
FIG. 4 illustrates an exemplary module for processing M2M activation orders to activate M2M devices.

Referring now to FIG. 4, a block diagram of an exemplary integration module 400 employed to manage bulk M2M device activation orders associated with M2M devices 402, 404 is illustrated. As depicted, the integration module 400 may be configured to communicate with, for example, a warehouse 406 or factory to activate the plurality of M2M devices 402 (e.g., vending machines or telephones) stored therein. Alternatively, or in addition, integration module 400 may communicate with, for example, an office building 408 to activate the plurality of M2M devices 404 already installed in the working environment (e.g., sensor devices installed in the office building 408).

The warehouse 406 and office building 408 depicted in FIG. 4 are merely exemplary. Further, though not shown, the integration module 400 may communicate with a site to activate M2M devices that are located off-site.

By employing techniques described above with respect to FIGS. 2A-3 and/or system 100 of FIG. 1, integration module 400 of FIG. 4 can process bulk activation orders or requests to activate a plurality of M2M devices.

With respect to the exemplary system 100 of FIG. 1 and the exemplary techniques (e.g., techniques 200 and 300 of FIGS. 2A-2B and FIG. 3, respectively), computing systems and/or devices generally include computer-executable instructions, where the instructions may be executable by one or more computing devices such as those listed below. Computer-executable instructions may be compiled or interpreted from computer programs created using a variety of programming languages and/or technologies, including, without limitation, and either alone or in combination, XML, Java™, C, C++, Visual Basic, Java Script, Perl, etc. The exemplary system 100 and items therein may take many different forms and include multiple and/or alternate components. While exemplary systems, devices, applications, databases, and modules are shown in the Figures or described above, the exemplary components illustrated in the Figures are not intended to be limiting. Indeed, additional or alternative components and/or implementations may be used, and thus the above examples should not be construed as limiting.

In general, systems and/or devices (e.g., system 100 and device 130) may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing systems and/or devices include, without limitation, servers, cell phones, smart-phones, super-phones, tablet computers, next generation portable devices, handheld computers, secure voice communication equipment, or some other computing system and/or device.

Further, the processor or the microprocessor (e.g., CPU 132) of computing systems and/or devices receives instructions from the memory (e.g., computer readable storage medium 128) and executes these instructions, thereby performing one or more processes, including one or more of the processes described herein. Such instructions and other data may be stored and transmitted using a variety of computer-readable mediums.

A CPU (e.g., CPU 132) or processor may include processes comprised from any hardware, software, or combination of hardware or software that carries out instructions of a computer programs by performing logical and arithmetical calculations, such as adding or subtracting two or more numbers, comparing numbers, or jumping to a different part of the instructions. For example, a CPU may be any one of, but not limited to single, dual, triple, or quad core processors (on one single chip), graphics processing units, visual processing units, and virtual processors.

Memory (e.g., computer readable storage medium 128) may be, in general, any computer-readable medium (also referred to as a processor-readable medium) that may include any non-transitory (e.g., tangible) medium that participates in providing data (e.g., instructions) that may be read by a computer (e.g., by CPU 132 of exemplary computing device 130). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, the system 100 may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the operations described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary. Further, the use of terms such as "first," "second," "third," and the like that immediately precede an element(s) do not necessarily indicate sequence unless set forth otherwise, either explicitly or inferred through context.

The invention claimed is:

1. A computing device comprising:
an integration module having a processor and a memory storing instructions, the processor, which when executing the instructions, causes the integration module to manage activation orders that request activation of machine-to-machine (M2M) devices, wherein the integration module is configured to:
receive an M2M bulk activation order from a first user, the M2M bulk activation order having information associated with a first plurality of electronic devices;
provide a device identification request to a first database to identify a first plurality of M2M devices from the first plurality of electronic devices;
receive from the first database a device identification response that identifies the first plurality of M2M devices from the first plurality of electronic devices;
request, via a number reservation request provided after the device identification request, a unique number for each respective M2M device of the first plurality of M2M devices;
receive, in response to the number reservation request, a number reservation response having the unique number for each respective M2M device of the first plurality of M2M devices;
activate the first plurality of M2M devices after the number reservation response is received; and
provide a notification to the first user to indicate that the first plurality of M2M devices have been activated.

2. The computing device of claim 1, wherein the integration module is further configured to:
receive a plurality of activation orders each for a unique M2M device; and
aggregate the plurality of activation orders to create a second M2M bulk activation order.

3. The computing device of claim 1, wherein the device identification request is an extensible markup language (XML) device identification request, the device identification response is an XML device identification response, the number reservation request is an XML number reservation request, and the number reservation response is an XML number reservation response.

4. The computing device of claim 3, wherein the integration module is further configured to:
provide an XML billing and activation request to a billing system to initiate a billing of the M2M bulk activation order and cause the activation of the first plurality of M2M devices, wherein the XML billing and activation request includes the unique number for each respective M2M device of the first plurality of M2M devices; and
receive, in response to the XML billing and activation request, an XML billing and activation response that indicates a confirmation that the first plurality of M2M devices is activated and the billing has been initiated.

5. The computing device of claim 4, wherein the integration module is further configured to validate the M2M bulk activation order, wherein validation of the M2M bulk activation order includes a verification of a password of the user and a verification of a format of the M2M bulk activation order.

6. The computing device of claim 5, wherein the integration module is further configured to notify the user whether the validation of the M2M bulk activation order was successful or not successful, and wherein validation of the M2M bulk order occurs before the XML device identification request is provided to the first database.

7. The computing device of claim 6, wherein the integration module is further configured to:
save a record of the M2M bulk activation order in response to the validation of the M2M bulk activation order; and
compare at least a portion of the record to at least a portion of the confirmation to ensure the confirmation is associated with the M2M bulk activation order, wherein the comparison occurs after the notification that the validation of the M2M bulk order was successful.

8. The computing device of claim 3, wherein the integration module is further configured to:
provide an XML profile request, prior to the XML device identification request, to a profile database, the profile database having a plurality of profiles each respectively associated with users; and
receive an XML profile response, in response to the XML profile request, from the profile database, wherein the XML profile response includes a credit approval for the M2M bulk order.

9. The computing device of claim 8, wherein the integration module is further configured to:
provide a XML credit validation request to a credit application, wherein the XML credit validation request is provided to the credit application before the XML device identification request is provided to the first database; and
receive, in response to the XML credit validation request, a XML credit validation response that indicates to the integration application that the credit approval is validated, wherein the XML credit validation response is received by the integration application before the XML device identification request is received by the integration module.

10. A system comprising:
an integration module configured to receive a machine-to-machine (M2M) bulk activation order from a user, the M2M bulk activation order comprising an order to activate a plurality of electronic devices;
a first database having information associated with M2M devices, the first database configured to provide a device identification response to the integration module, wherein the device identification response identifies a first plurality of M2M devices in the plurality of electronic devices;
a number inventory configured to provide a number response to the integration module, the number response includes a plurality of numbers, wherein the plurality of numbers is associated with the first plurality of M2M devices; and
a middleware application configured to:
receive an activation request from the integration module, the activation request includes the first plurality of numbers;
determine if the activation request is in a proper format; and
provide the integration module an acknowledgment that the first plurality of M2M devices is activated;
and wherein the integration module is further configured to provide a notification to the user that the first plurality of M2M devices have been activated.

11. The system of claim 10, wherein the device identification response is an extensible markup language (XML) device identification response, the number response is an XML number response, the activation request is an XML activation request, and the proper format is an XML format.

12. The system of claim 11 further comprising a billing application configured to initiate a billing for the M2M bulk activation order, wherein the billing application initiates the billing after the middleware application receives the XML activation request.

13. The system of claim 11, wherein the first plurality of M2M devices includes at least eight hundred M2M devices, and wherein each number in the plurality of numbers is one of a static internet protocol (IP) address and a telephone number.

14. The system of claim 11, wherein the integration module is further configured to provide an XML device identification request to the first database to cause the first database to identify the first plurality of M2M devise in the plurality of electronic devices.

15. The system of claim 11 further comprising a second database configured to:
receive from the integration module an XML credit approval request, wherein the XML credit approval request is a request for a user credit approval and an acknowledgement that activation of the plurality of electronic devices is allowed; and
provide, in response to the XML credit approval request, an XML credit approval response to the integration module that includes the user credit approval and the acknowledgement, wherein the system is configured to provide the XML credit approval response to the integration module before the XML device identification response is provided to the integration module.

16. The system of claim 15 further comprising a credit validation application configured to:
validate the user credit approval; and
provide an XML credit validation response to the integration module that indicates that the user credit approval is valid.

17. A method comprising:
receiving, in an application stored on a computer readable storage medium, a single order for activation of a first plurality of electronic devices;
receiving, in response to an application interface (API) credit validation call, a validation of a credit approval for the single order;
employing an API device identification call to identify machine-to-machine (M2M) devices in the first plurality of electronic devices;
receiving, in response to an API number call employed after the API device identification call, a first plurality of numbers each uniquely associated with an identified M2M device of the first plurality of electronic devices, wherein each number of the first plurality of numbers is one of a telephone number and a static internet protocol (IP) address; and
employing an API activation call to submit the first plurality of numbers to an activation system to initiate an activation of each identified M2M device of the first plurality of electronic devices.

18. The method of claim 17 further comprising receiving a first acknowledgment in the application, via an API activation callback, that each identified M2M device of the first plurality of electronic devices has been activated, wherein each of the API device identification call, the API credit validation call, the API number call, and the API activation call employ an extensible markup language (XML) format.

19. The method of claim 18 further comprising sending, via a API order completion callback, a notice to a user that placed the single order that the single order has been processed.

20. The method of claim 17 further comprising:
receiving, from a user, a plurality of orders for a second plurality of electronic devices;
aggregating the plurality of orders into a second single order;
employing the API device identification call to identify M2M devices in the second plurality of electronic devices;
receiving, in response to the API number call, a second plurality of numbers each uniquely associated with an identified M2M device of the second plurality of electronic devices, wherein each number of the second plurality of numbers is one of a telephone number and a static IP address; and
employing the API activation call to submit the second plurality of numbers to the activation system to initiate an activation of the identified M2M devices of the second plurality of electronic devices.

* * * * *